Patented Jan. 29, 1952

2,583,614

UNITED STATES PATENT OFFICE 2,583,614

ACYLATED METHINE DYE COMPOUNDS

George J. Taylor, Kingsport, Tenn., and Joseph B. Dickey, Rochester, N. Y., assignors to Eastman Kodak Company, Rochester, N. Y., a corporation of New Jersey No Drawing. Application May 13, 1950, Serial No. 161,894

7 Claims. (Cl. 260—465)

This invention relates to new methine dye compounds and their application to the art of dyeing or coloring.

We have discovered that the new methine compounds having the general formula:

I.

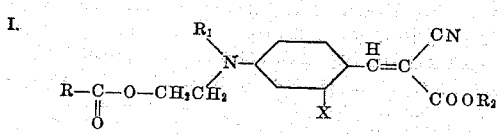

wherein R represent a methyl group, an ethyl group, a propyl group, a $CH_3$—O—$CH_2$— group or a $CH_3CH_2$—O—$CH_2$— group, $R_1$ represents an alkyl group having one to three, inclusive, carbon atoms, $R_2$ represents an alkyl group having one to four, inclusive, carbon atoms or a —$CH_2CH_2$—O—$R_3$ group, wherein $R_3$ represents an alkyl group having one to two, inclusive, carbon atoms and X represents a hydrogen atom or a methyl group and wherein when X is a methyl group $R_1$ may also be a

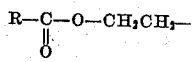

group, wherein R has the meaning previously assigned to it are very valuable dyes for coloring textile materials made of or containing a cellulose carboxylic acid ester having two to four carbon atoms in the acid groups thereof. These dye compounds when applied to the aforesaid textile materials give greenish-yellow dyeings which are fast to gas and which have exceptional fastness to light. Additionally, the dye compounds possess good sublimation properties and good affinity for the aforesaid textile materials. Those compounds wherein X is a methyl group absorb at a longer wave length than the corrresponding compounds wherein X is a hydrogen atom and accordingly are more orange-yellow. Due to the widespread use of cellulose acetate textile materials, the new methine dye compounds are presently primarily of importance for the coloration of such materials.

It is an object of our invention to provide new methine dye compounds. Another object is to provide a satisfactory process for the preparation of the new methine dye compounds. A further object is to provide dyed cellulose alkyl carboxylic acid ester textile materials which are fast to gas and which possess unusually good fastness to light.

By cellulose carboxylic acid esters having two to four carbon atoms in the acid groups thereof, we mean to include, for example, both hydrolyzed and unhydrolyzed cellulose acetate, cellulose propionate, cellulose butyrate, cellulose acetate-propionate and cellulose acetate-butyrate.

The new methine dye compounds are prepared by acylating the corresponding N-β-hydroxyethyl methine compounds having the general formulas:

II.

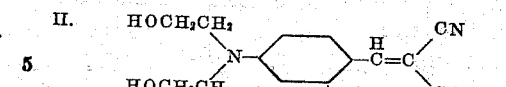

and

III.

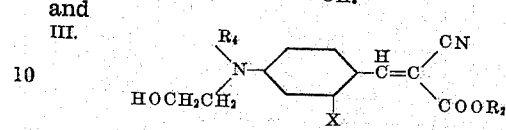

wherein $R_2$ and X have the meaning previously assigned to them and $R_4$ represents an alkyl group having one to four, inclusive, carbon atoms with an appropriate acylating agent or agents. Suitable acylating agents include acetic anhydride, propionic anhydride, n-butyric anhydride, β-methoxyacetic anhydride and β-ethoxyacetic anhydride.

As the manner in which acylation can be carried out is well known to those skilled in the art and as the manner of preparing applicants' compounds is entirely clear from the detailed examples which follow a detailed description of the acylation reaction at this point is believed unnecessary. In general the temperature employed is not critical. The temperatures set forth in the examples have been found very suitable although somewhat higher or lower temperatures can be employed. Also, as will be understood, the reaction can be carried out in the presence of an inert solvent or diluent such as pyridine, benzene, dioxane, isopropyl ether or ethyl acetate, for example. Where only one acylation agent is employed, as in Example 1, an excess of the acylating agent is ordinarily employed. In this case the anhydride serves both as a solvent or diluent and an acylating agent. However, as above indicated, an inert solvent or diluent, such as those mentioned hereinbefore, can also be used, if desired.

When preparing compounds of the formula:

IV

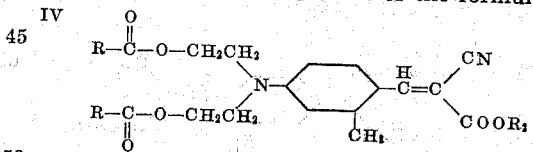

wherein the one R is different than the other R,, a methine compound having the formula numbered II is reacted with exactly one mol equivalent of an appropriate anhydride and then with at least one mol equivalent of a second anhydride. Care should be taken not to add the first acylating agent faster than it is being reacted as otherwise there will be a tendency for both hydroxyl groups of the hydroxyalkyl methine compound to undergo reaction. Also, high temperatures should be avoided during the introduction of the first acyl group because of the increased tendency of both hydroxyl groups to undergo reaction at higher temperatures. Temperatures of 50 C.–80° C., for example, are suitable when preparing the compounds having the formula numbered IV. These temperatures, however, do not represent limits.

We are aware that methine dye compounds are not broadly new. However, while the prior art discloses a considerable number of methine dyestuffs, so far as we are aware they are inferior to our new methine dye compounds for the dyeing of cellulose acetate textile materials. Thus, the dye compounds of the present application are not only new but they possess superior dyeing properties as well. To illustrate, the dyeings obtained on cellulose acetate textile materials with the dye,

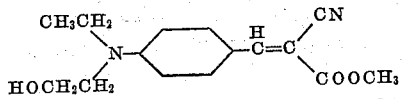

are not as fast to light or steam as those obtained with the dyes of the present application. Similarly, the dyeings obtained on cellulose acetate textile materials with the dye

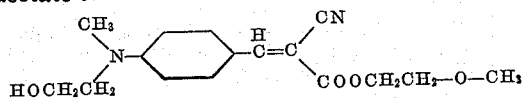

are not as fast to light as those obtained with applicants' dye compounds.

The following examples illustrate the new methine dye compounds of our invention and their manner of preparation. Parts are expressed as parts by weight.

*Example 1*

315 parts of p-(di-β-hydroxyethylamino)-o-methylbenzylidene methylcyanoacetate

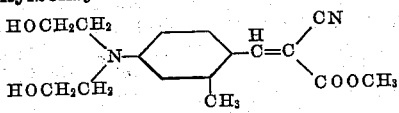

and 1692 parts of acetic anhydride are mixed together and stirred. The temperature is permitted to rise to 90 C. and is kept at 90 C., while stirring, for 2 hours more. Acetic acid formed during the reaction and unreacted acetic anhydride are then removed from the reaction mixture by distillation under reduced pressure (e. g. 3 mm.– 10 mm.). The desired dye compound starts to crystallize and 960 parts of petroleum ether (B. P. 35 C.–55 C.) are added with stirring and cooling. When crystallization is complete, the reaction mixture is filtered (on a Büchner funnel, for example). A good yield of

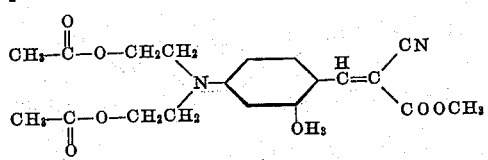

melting at 123 C.–125 C. is obtained.

*Example 2*

315 parts of p-(di-β-hydroxyethylamino)-o-methylbenzylidene methylcyanoacetate and 1569 parts of propionic anhydride are mixed together and stirred. The temperature rises to 100 C. and is kept at 90 C., while stirring, for 2 hours more. Propionic acid formed during the reaction and unreacted propionic anhydride are then removed from the reaction mixture by distillation under reduced pressure (e. g. 3 mm.). The desired dye compound starts to crystallize and 960 parts of petroleum ether (B. P. 35 C.–55 C.) are added with stirring and cooling. When crystallization is complete the reaction mixture is filtered. A good yield of p-(di-β-hydroxyethylamino) - o - methylbenzylidene methylcyanoacetate di-propionate

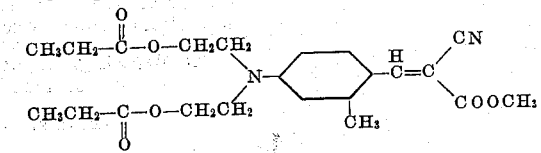

melting at 98 C.–100 C. is obtained.

*Example 3*

One part of p - (di-β-hydroxyethylamino)-o-methylbenzylidene methylcyanoacetate and 5 parts of n-butyric anhydride are heated, with stirring, at 70 C. for 2 hours. Then the n-butyric acid formed during the reaction and unreacted n-butyric anhydride are removed by distillation under reduced pressure (e. g. 3 mm.–10 mm.). The fraction remaining after the distillation is dissolved in ether and poured into petroleum ether (B. P. 35 C.–55 C.) and cooled. The desired dye compound crystallizes out and is recovered by filtration. A good yield of p-(di-β-hydroxyethylamino) - o - methylbenzylidene methylcyanoacetate di-n-butyrate having the formula

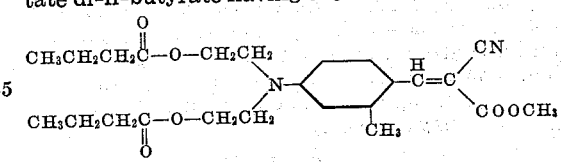

is obtained. It melts at 69 C.–71 C.

*Example 4*

10 parts of p-(methyl-, β-hydroxyethyl-) aminobenzylidene β - methoxyethylcyanoacetate are dissolved in 54 parts of propionic anhydride and heated, with stirring, at 75 C. for 2 hours. Then the propionic acid formed during the reaction and the unreacted propionic anhydride are distilled off under reduced pressure (e. g. 2 mm.–10 mm.). The residue remaining after the distillation is dissolved in ether and then about 40 part of petroleum ether (B. P. 35 C.–55 C.) are added with stirring. Upon cooling the reaction mixture p-(methyl-, β-hydroxyethyl-) aminobenzylidene β-methoxyethylcyanoacetate-n-propionate having the formula:

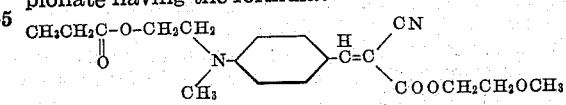

precipitates out as yellow crystals and is recovered by filtration and dried.

*Example 5*

By the use of 10.04 parts of p-(ethyl, β-hydroxyethyl-) aminobenzylidene β-methoxyethylcyanoacetate in place of p-(methyl-, β-hydroxyethyl-) aminobenzylidene β-methoxyethylcyanoacetate in Example 4 p-(ethyl-, β-hydroxyethyl-) aminobenzylidene β-methoxyethylcyanoacetate-n-propionate having the formula:

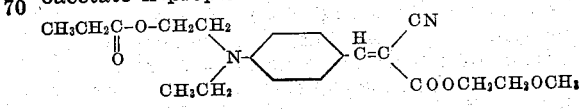

is obtained.

Example 6

5 parts of p-(ethyl-, β-hydroxyethyl-) aminobenzylidene β-methoxyethylcyanoacetate are heated, with stirring, for one hour at 76 C. with 27 parts of acetic anhydrides. Then the acetic acid formed during the reaction and the unreacted acetic anhydride are distilled off under pressure (e. g. 3 mm.–10 mm.). The reaction product is dissolved in ether and about 12 parts of petroleum ether (B. P. 35 C.–55 C.) are added with stirring. Upon cooling the reaction mixture p-(ethyl-, β-hydroxyethyl-) aminobenzylidene β-methoxyethylcyanoacetate monoacetate having the formula:

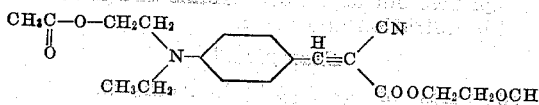

crystallizes out and is recovered by filtration and dried. It melts at 76 C.–77 C.

Example 7

5 parts of p-(di-β-hydroxyethylamino)-o-methylbenzylidene ethyl cyanoacetate are heated with 21.6 parts of acetic anhydride for 2 hours at 70 C. with stirring. Then the acetic acid formed during the reaction and unreacted acetic anhydride are removed from the reaction mixture by distillation under reduced pressure (e. g. 3 mm.–10 mm.). The fraction remaining after the distillation is dissolved in ether and poured into petroleum ether (B. P. 35 C.–55 C.) and cooled. The desired dye compound crystallizes out and is recovered by filtration. A good yield of p-(di-β-hydroxyethylamino)-o-methylbenzylidene ethyl cyanoacetate diacetate having the formula:

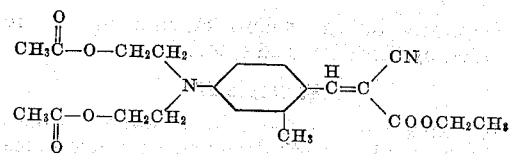

is obtained. It melts at 113 C.–115 C.

Example 8

By the use of 20.2 parts of propionic anhydride in place of acetic anhydride in Example 7 p-(di-β-hydroxyethylamino)-o-methylbenzylidene ethyl cyanoacetate di-n-propionate having the formula:

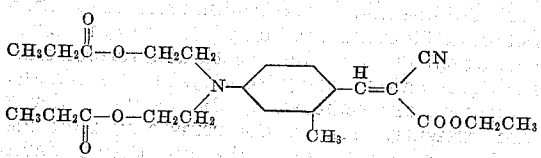

is obtained. It melts at 83 C.–85 C.

Example 9

5 parts of p-(di-β-hydroxyethylamino)-o-methylbenzylidene β-methoxyethylcyanoacetate are dissolved in 9.8 parts of pyridine and 2.55 parts of β-methoxyacetic anhydride in 4.9 parts of pyridine are added thereto at 55 C., with stirring, over a period of 10 minutes. Then the reaction mixture is heated to 65 C. and stirred for 2 hours at this temperature. Following this the reaction mixture is distilled at 2 mm. to remove the β-methoxyacetic acid formed during the reaction, pyridine and any unreacted β-methoxyacetic anhydride. The residue remaining after the distillation is dissolved in ether, poured into petroleum ether (B. P. 35 C.–55 C.) and cooled. The desired dye compound crystallizes out and is recovered by filtration, washed with petroleum ether and dried. It has the formula:

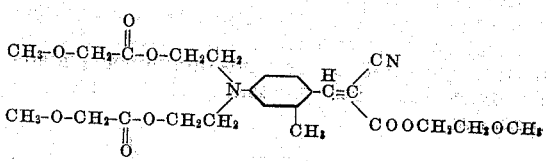

and melts at 82 C.–84 C.

Example 10

2 parts of p-(methyl-, β-hydroxyethyl-) aminobenzylidene β-methoxyethylcyanoacetate,

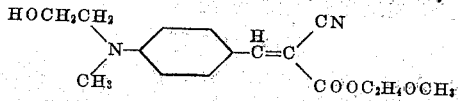

are dissolved in 10.8 parts of acetic anhydride and heated at about 75 C. for 2 hours. Then the acetic acid formed during the reaction and unreacted acetic anhydride are removed by distillation under reduced pressure (e. g. 3 mm.). The heavy yellow oil remaining is dissolved in ether and the ether solution is poured into about 10 parts of petroleum ether (B. P. 35 C.–55 C.). Upon cooling, p-(methyl-, β-hydroxyethyl-) aminobenzylidene β-methoxyethylcyanoacetate monoacetate crystallizes out as bright yellow crystals and is recovered by filtration. It has the formula:

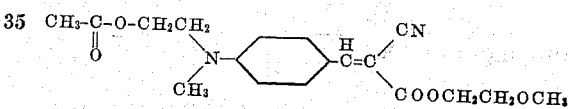

and melts at 64 C.

Example 11

28.8 parts of p - (di - β - hydroxyethylamino) - o - methylbenzylidene methylcyanoacetate are placed in 245.5 parts of pyridine and 9.7 parts of acetic anhydride dissolved in 49.1 parts of pyridine are added dropwise, with stirring, at 50 C. over a period of 2 hours. The reaction mixture is then heated to 70 C. for 1 hour after which it is cooled to 50 C. Then 13 parts of propionic anhydride dissolved in 49.1 parts of pyridine are added dropwise, with stirring, at 50 C. over a period of 2 hours. The reaction mixture is then heated to 70 C. for 1 hour. Following this the acetic acid and n-propionic acid formed during the reaction and the pyridine are removed by distillation under 2 mm. pressure. The heavy viscous yellow oil remaining after the distillation is dissolved in ether, poured into petroleum ether (B. P. 35 C.–55 C.) and cooled, with stirring, to 0 C. The desired dye compound having the formula:

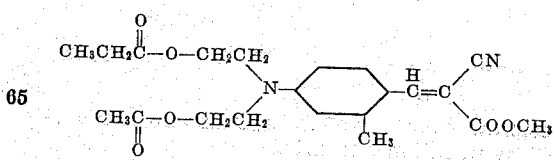

separates as fine yellow crystals and is recovered by filtration, washed with petroleum ether and dried.

Example 12

10 parts of p-(n-propyl-, β-hydroxyethyl-)-aminobenzylidene methylcyanoacetate are dissolved in 50 parts of acetic anhydride and heated, with stirring, at 75 C. for 2 hours. Then the acetic acid formed during the reaction and the unreacted acetic anhydride are distilled off under a reduced pressure of 3 mm. The residue remaining after the distillation is dissolved in ether and then 40 parts of petroleum ether are added with stirring. Upon cooling the reaction mixture p-(n-propyl-, β-hydroxyethyl-)aminobenzylidene methylcyanoacetate monoacetate having the formula:

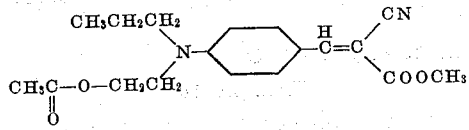

precipitates out as yellow crystals and is recovered by filtration and dried.

Example 13

10 parts of p-(methyl-, β-hydroxyethyl-)-aminobenzylidene n-butylcyanoacetate are dissolved in 55 parts of propionic anhydride and heated, with stirring, at 75 C. for 2 hours. Then the n-propionic acid formed during the reaction and the unreacted propionic anhydride are distilled off under reduced pressure (e. g. 2 mm.–10 mm.). The residue remaining after the distillation is dissolved in ether and then about 40 parts of petroleum ether are added with stirring. Upon cooling the reaction mixture p-(methyl-, β-hydroxyethyl-)aminobenzylidene n-butylcyanoacetate n-propionate having the formula:

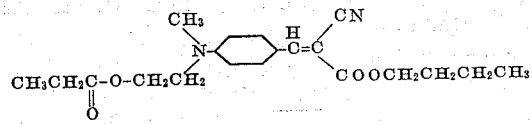

precipitates out as yellow crystals and is recovered by filtration and dried.

Example 14

10 parts of p-(di-β-hydroxyethylamino)-o-methylbenzylidene methylcyanoacetate are dissolved in 19 parts of pyridine and 8 parts of β-ethoxyacetic anhydride in 15 parts of pyridine are added thereto at 55 C., with stirring, over a period of 30 minutes. Then the reaction mixture is heated to 65 C. and stirred for 2 hours at this temperature. Following this, the reaction mixture is distilled at 2 mm. to remove the β-ethoxyacetic acid formed during the reaction, pyridine and any unreacted β-ethoxyacetic anhydride. The residue remaining after the distillation is dissolved in ether and then 40 parts of petroleum ether are added with stirring. Upon cooling the reaction mixture p-(di-β-hydroxyethylamino)-o-methylbenzylidene methylcyanoacetate di-β-methoxyethylacetate having the formula:

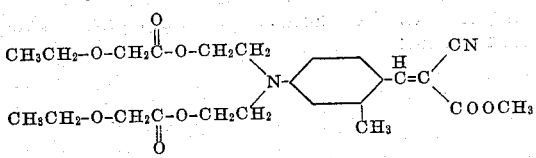

precipitates out as yellow crystals and is recovered by filtration and dried.

Example 15

10 parts of p-(di-β-hydroxyethylamino)-o-methylbenzylidene n-propylcyanoacetate are dissolved in 50 parts of acetic anhydride and heated, with stirring, at 75 C. for 2 hours. Then the acetic acid formed during the reaction and the unreacted acetic anhydride are distilled off under a reduced pressure of 3 mm. The residue remaining after the distillation is dissolved in ether and then about 40 parts of petroleum ether are added with stirring. Upon cooling the reaction mixture p-(di-β-hydroxyethylamino)-o-methylbenzylidene n-propylcyanoacetate diacetate having the formula:

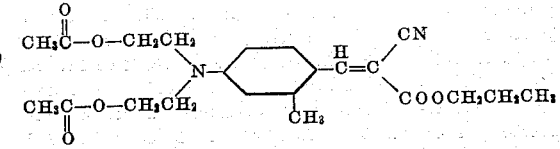

precipitates out as yellow crystals and is recovered by filtration and dried.

Example 16

10 parts of p-(di-β-hydroxyethylamino)-o-methylbenzylidene β-ethoxyethylcyanoacetate are dissolved in 55 parts of propionic anhydride and heated, with stirring, at 75 C. for 2 hours. Then the n-propionic acid formed during the reaction and the unreacted propionic anhydride are distilled off under a reduced pressure of 2 mm. The residue remaining after the distillation is dissolved in ether and then about 40 parts of petroleum ether are added with stirring. Upon cooling the reaction mixture p-(di-β-hydroxyethylamino)-o-methylbenzylidene β-ethoxyethylcyanoacetate di-n-propionate having the formula:

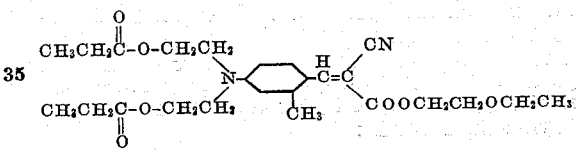

precipitates out as yellow crystals and is recovered by filtration and dried.

Example 17

10 parts of p-(di-β-hydroxyethylamino)-o-methylbenzylidene ethylcyanoacetate are placed in 85 parts of pyridine and 3.2 parts of acetic anhydride dissolved in 17 parts of pyridine are added dropwise, with stirring, at 50 C. over a period of one hour. The reaction mixture is then heated to 70 C. for one hour after which it is cooled to 50 C. Then 6 parts of β-methoxyacetic anhydride dissolved in 17 parts of pyridine are added dropwise, with stirring, at 50 C. over a period of one hour. The reaction mixture is then heated to 70 C. for one hour. Following this, the acetic acid and β-methoxyacetic acid formed during the reaction, the pyridine and any unreacted anhydride are removed by distillation under 2 mm. pressure. The residue remaining after the distillation is dissolved in ether and then 40 parts of petroleum ether are added. Upon cooling the reaction mixture, the reaction product precipitates as yellow crystals and is recovered by filtration, washed with water and dried at 40 C. It has the formula:

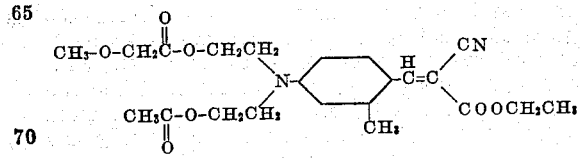

In order that the preparation of the compounds of our invention may be entirely clear, the preparation of various intermediate compounds used in their manufacture is disclosed hereinafter.

Compounds having the formula numbered II are prepared by reacting 4'-(di-β-hydroxyethylamino)-2'-methylbenzalaniline 3-sulfonic acid having the formula:

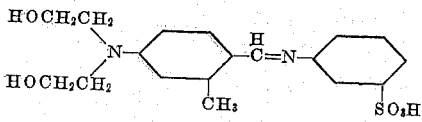

with a cyanoacetate compound having the formula:

NCCH₂COOR₂ wherein R₂ has the meaning previously assigned to it. The reaction is ordinarily carried out in an inert solvent, such as methanol or ethanol, and in the presence of an alkaline agent such as sodium bicarbonate or sodium carbonate. The following example is illustrative of the manner in which the compounds having the formula numbered II are prepared.

*Example 18*

22.9 parts of 4'-(di-β-hydroxyethylamino)-2'-methylbenzalaniline-3-sulfonic acid, 6 parts of methylcyanoacetate and 2.55 parts of sodium bicarbonate are placed in 186 parts of 50% (by volume) aqueous methyl alcohol in a 1-liter flask equipped with a stirrer and a reflux condenser and the reaction mixture is refluxed with stirring for 24 hours. Then refluxing is discontinued and the methyl alcohol is distilled off while stirring. Following this the reaction mixture is cooled, while stirring, and the yellow crystalline reaction product crystallizes out and is recovered by filtration, washed with water and dried at 50 C. 15.8 parts of p-(di-β-hydroxyethylamino)-o-methylbenzylidene methylcyanoacetate melting at 148 C. are obtained.

The other compounds having the formula numbered II are similarly prepared by the use of an equivalent molecular weight of the other cyanoacetate compounds having the formula

NCCH₂COOR₂ in place of methylcyanoacetate.

Compounds having the formula numbered III are prepared by reacting a compound having the formula:

V.
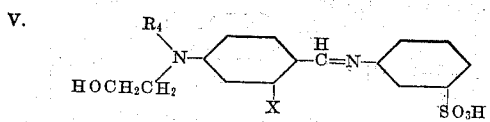

with a cyanoacetate compound having the formula:

NCCH₂COOR₂

R₂, R₄ and X in the formula just given have the meaning previously assigned to them. This reaction is carried out in exactly the same way as that used to prepare the compounds having the formula numbered II.

4'-(di-β-hydroxyethylamino)-2'-methylbenzalaniline-3-sulfonic acid and the related compounds having the formula numbered V are prepared as described hereinafter.

*Example 19*

To a cold (0 C.-5 C.) solution of 145 parts of N,N-di-β-hydroxyethyl-m-toluidine in 750 parts of water and 112 parts of concentrated hydrochloric acid (specific gravity 1.18) are added 72.8 parts of commercial formaldehyde (35–40%). The reaction mixture is allowed to stand for 24 hours at 5 C. after which 230 parts of sodium-m-nitrobenzenesulfonate trihydrate are added at 5 C. and then one liter of cold water (5 C.) is added. 548 parts of concentrated hydrochloric acid (specific gravity 1.18) and 200 parts of iron filings are gradually added with stirring over a five hour period. During this addition the temperature rises to about 20 C. during the first hour and is kept at 20 C. for the remaining four hours. The reaction mixture is then stirred for an additional one-half hour and then unreacted iron is allowed to settle out. This settling ordinarily requires about 10 minutes. The supernatant liquid or suspension is decanted (or siphoned) from the iron and allowed to stand for 24 hours at 5 C. (in some cases a somewhat longer standing time may be desirable). The desired reaction product is recovered by filtration, washed with cold water until free of iron salts and dried at 50 C. 160 parts of 4'-(di-β-hydroxyethylamino)-2'-methylbenzalaniline-3-sulfonic acid are recovered as bright yellow crystals.

Compounds having the formula V are prepared in an exactly similar way as 4'-(di-β-hydroxyethylamino)-2'-methylbenzalaniline-3-sulfonic acid except that an equivalent molecular weight of a compound having the formula:

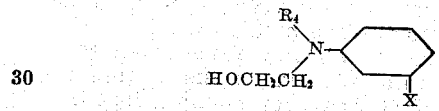

wherein R₄ and X have the meaning previously assigned to them is used instead of N,N-di-β-hydroxyethyl-m-toluidine.

*Example 20*

55 parts of 20% oleum are placed in a suitable reaction vessel and while stirring 12.3 parts of nitrobenzene are added over a period of one hour while keeping the reaction temperature between 20 C.-30 C. The reaction mixture is then slowly heated to 65 C. over a period of 7-8 hours at about 5° per hour. The sulfonation is complete when a drop of the sulfonation mixture in water gives a clear solution and gives no odor of nitrobenzene.

Upon completion of the sulfonation reaction, the reaction mixture is cooled to 25 C.-30 C. and poured slowly, with stirring, onto about 35 parts of crushed ice and 20 parts of water. The desired compound is salted out of solution by stirring in about 20 parts of salt. The grayish-white solid that separates is filtered and washed with a cold aqueous sodium chloride solution of 10% strength until free of acid. Upon air drying, about 27 parts of sodium-m-nitrobenzene trihydrate having the formula:

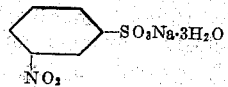

are obtained.

The cyanoacetate compounds, such as methylcyanoacetate, ethylcyanoacetate, propylcyanoacetate and butylcyanoacetate are known compounds. β-Methoxyethylcyanoacetate and β-ethoxyethylcyanoacetate are prepared as described hereinafter.

*Example 21*

21 grams of cyanoacetic acid, 1 gram of p-toluenesulfonic acid and 150 grams of ethylene glycol monomethylether are placed in a 500 cc. flask under an esterification column and heated to boiling. After about 6 cc. of water are collected, the excess ethylene glycol monomethylether is removed by distillation under a reduced pressure of 25 mm., for example. The fraction remaining after removing the excess glycol is distilled under a reduced pressure of 1–2 mm. β-Methoxyethylcyanoacetate boiling at 98 C.–100 C./1 mm. is recovered as a clear colorless liquid.

*Example 22*

By the use of 177 grams of ethylene glycol monoethylether in place of ethylene glycol monomethylether in Example 21, β-ethoxyethylcyanoacetate is obtained as a clear, colorless liquid.

The new methine dye compounds of our invention may be advantageously directly applied to the material undergoing coloration in the form of an aqueous suspension which can be prepared by grinding the dye to a paste in the presence of a sulfonated oil, soap, sodium lignin sulfonate, or other suitable dispersing agent and dispersing the resulting paste in water.

Direct dyeing operations can, with advantage, be conducted at temperatures of about 70 C.–90 C. but any suitable temperature can be used. Thus, the textile material such as cellulose acetate, for example, to be dyed or colored is ordinarily added to the dye bath at a temperature lower than that at which the main portion of the dyeing is to be effected. A temperature approximating 45 C.–55 C., for example, following which the temperature is raised to that selected for carrying out the dyeing operation. The temperature at which the dyeing is conducted may, of course, be varied somewhat depending upon the particular material undergoing coloration. As is understood by those skilled in the dyeing art, the intensity of dyeing can be varied by varying the proportion of dye to material undergoing coloration. The amount of dye used can be, for example, ⅓% to 3% (by weight) of that of the textile material, although lesser or greater amounts of dye can be used.

We claim:

1. The methine dye compounds having the general formula:

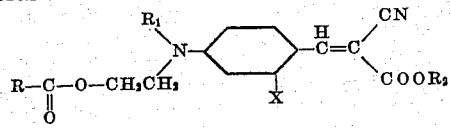

wherein R represents a member selected from the group consisting of a methyl group, an ethyl group, a propyl group, a CH₃—O—CH₂— group or a CH₃CH₂—O—CH₂— group, R₁ represents an alkyl group having one to three, inclusive, carbon atoms, R₂ represents a member selected from the group consisting of an alkyl group having one to four, inclusive, carbon atoms and a

—CH₂CH₂—O—R₃ group, wherein R₃ represents an alkyl group having one to two, inclusive, carbon atoms and X represents a member selected from the group consisting of a hydrogen atom and a methyl group and wherein when X is a methyl group R₁ may also be a

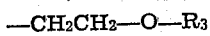

group, wherein R has the meaning previously assigned to it.

2. The methine dye compound having the formula:

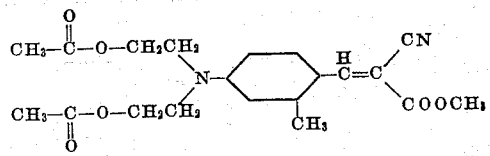

3. The methine dye compound having the formula:

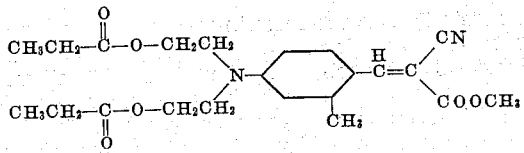

4. The methine dye compound having the formula:

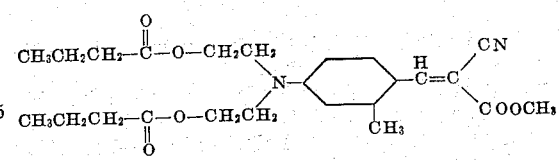

5. The methine dye compound having the formula:

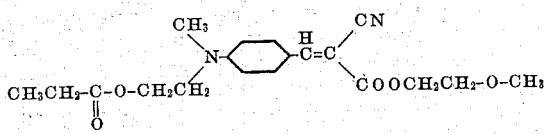

6. The methine dye compound having the formula:

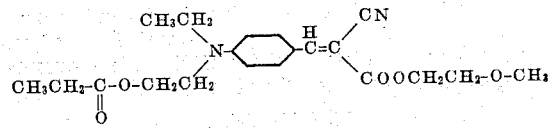

7. The methine dye compounds having the general formula:

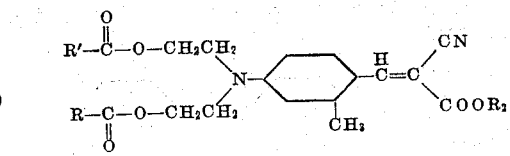

wherein R and R' each represents an alkyl group having one to three, inclusive, carbon atoms and R₂ represents an alkyl group having one to four, inclusive, carbon atoms.

GEORGE J. TAYLOR.
JOSEPH B. DICKEY.

REFERENCES CITED

The following references are of record in the file of this patent:

UNITED STATES PATENTS

| Number | Name | Date |
|---|---|---|
| 2,206,108 | Muller | July 2, 1940 |

FOREIGN PATENTS

| Number | Country | Date |
|---|---|---|
| 808,268 | France | Feb. 2, 1937 |
| 194,193 | Switzerland | Feb. 16, 1938 |